Nov. 24, 1931.   D. C. BEIDLER ET AL   1,833,668
CAMERA AND THE LIKE
Original Filed May 13, 1927   5 Sheets-Sheet 4
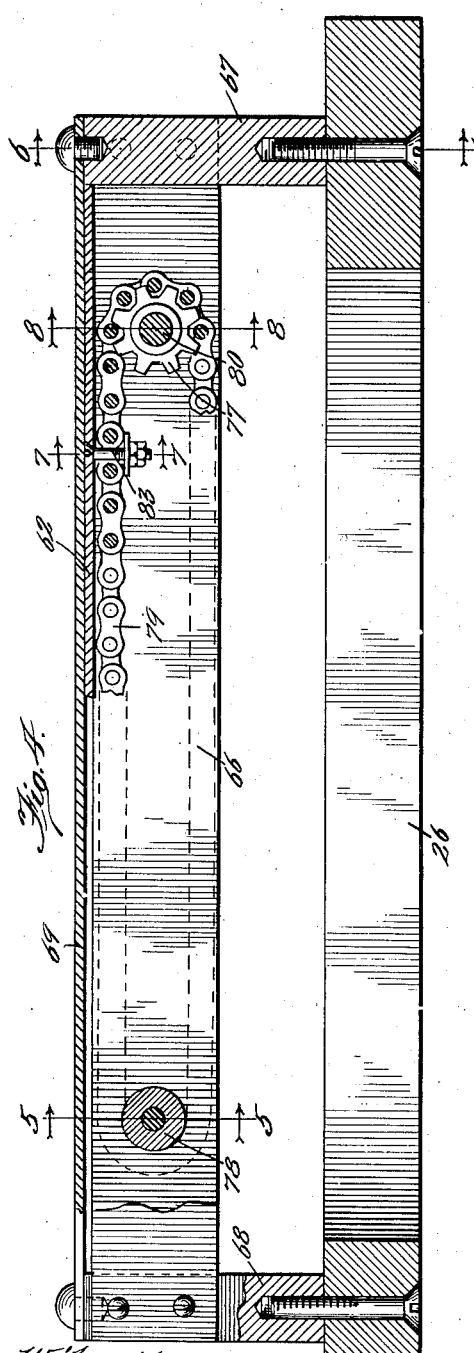

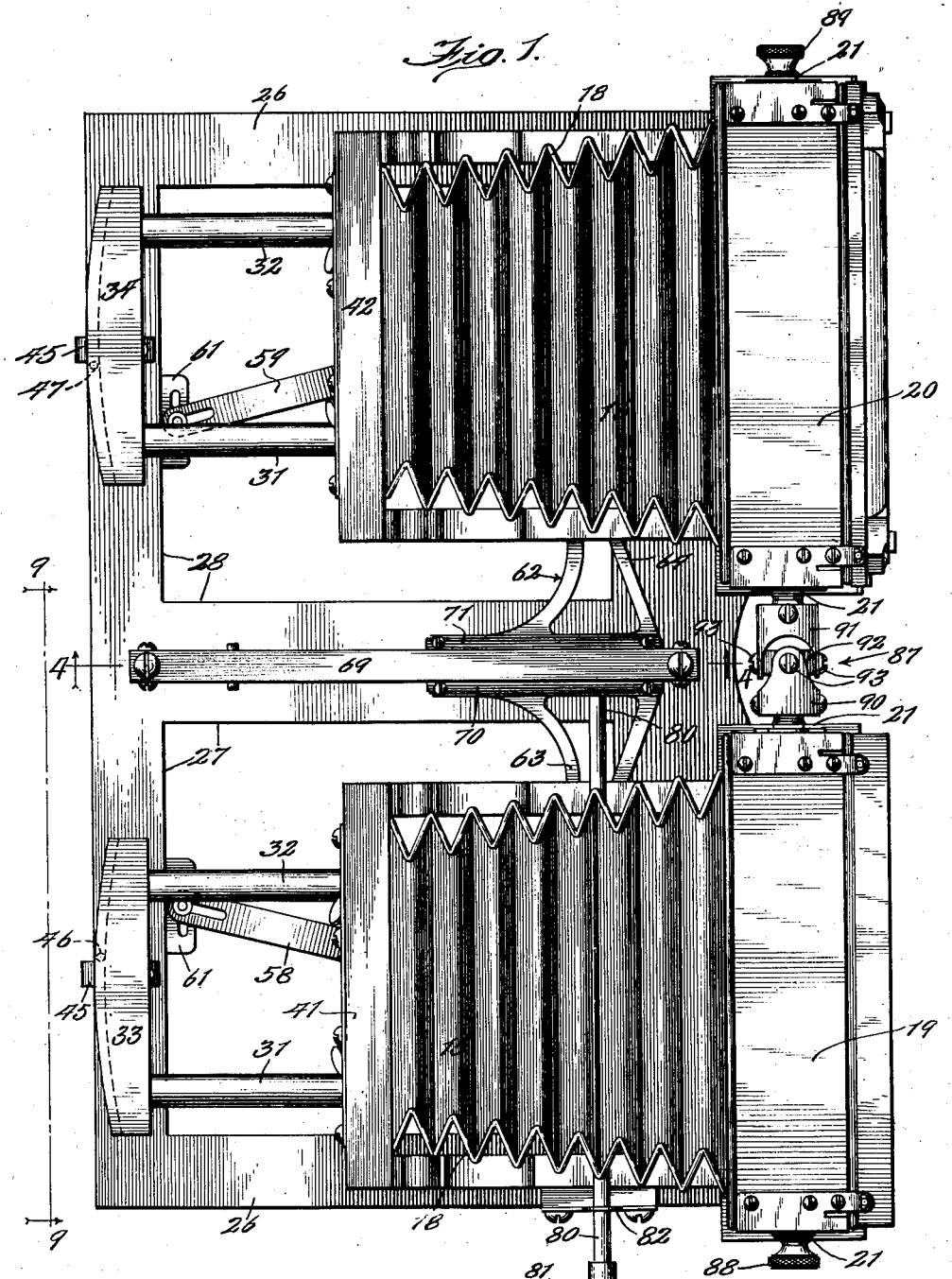

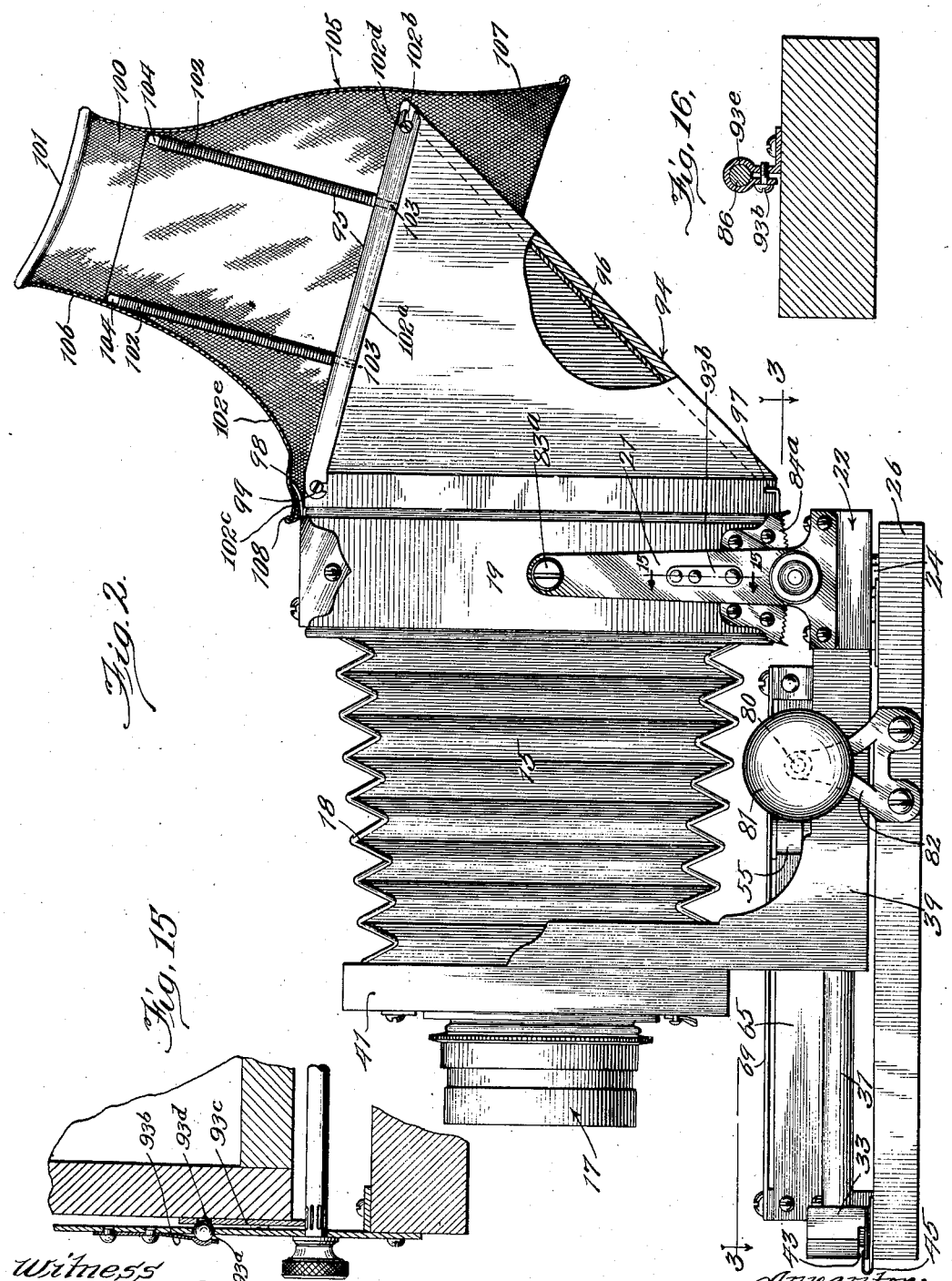

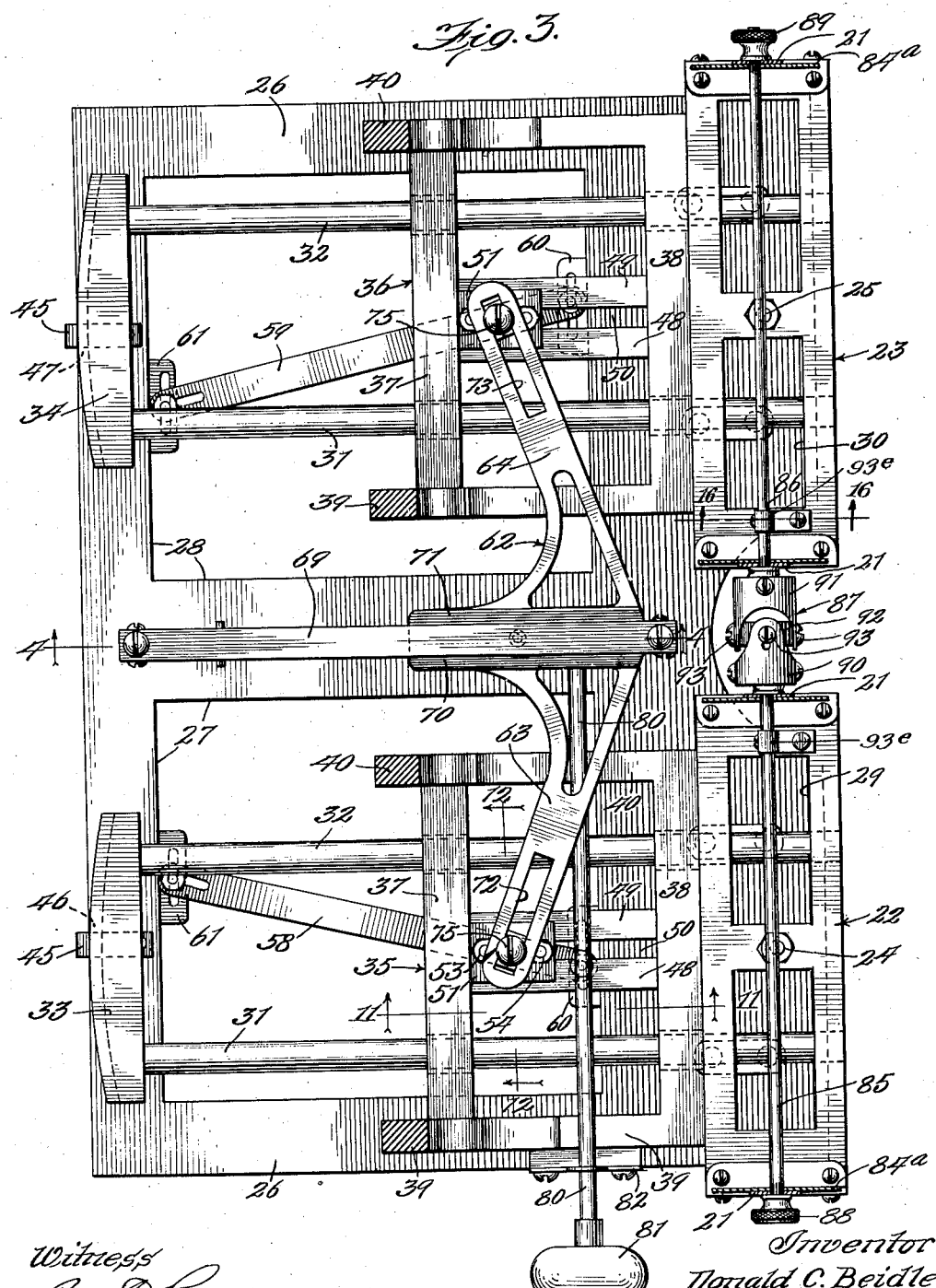

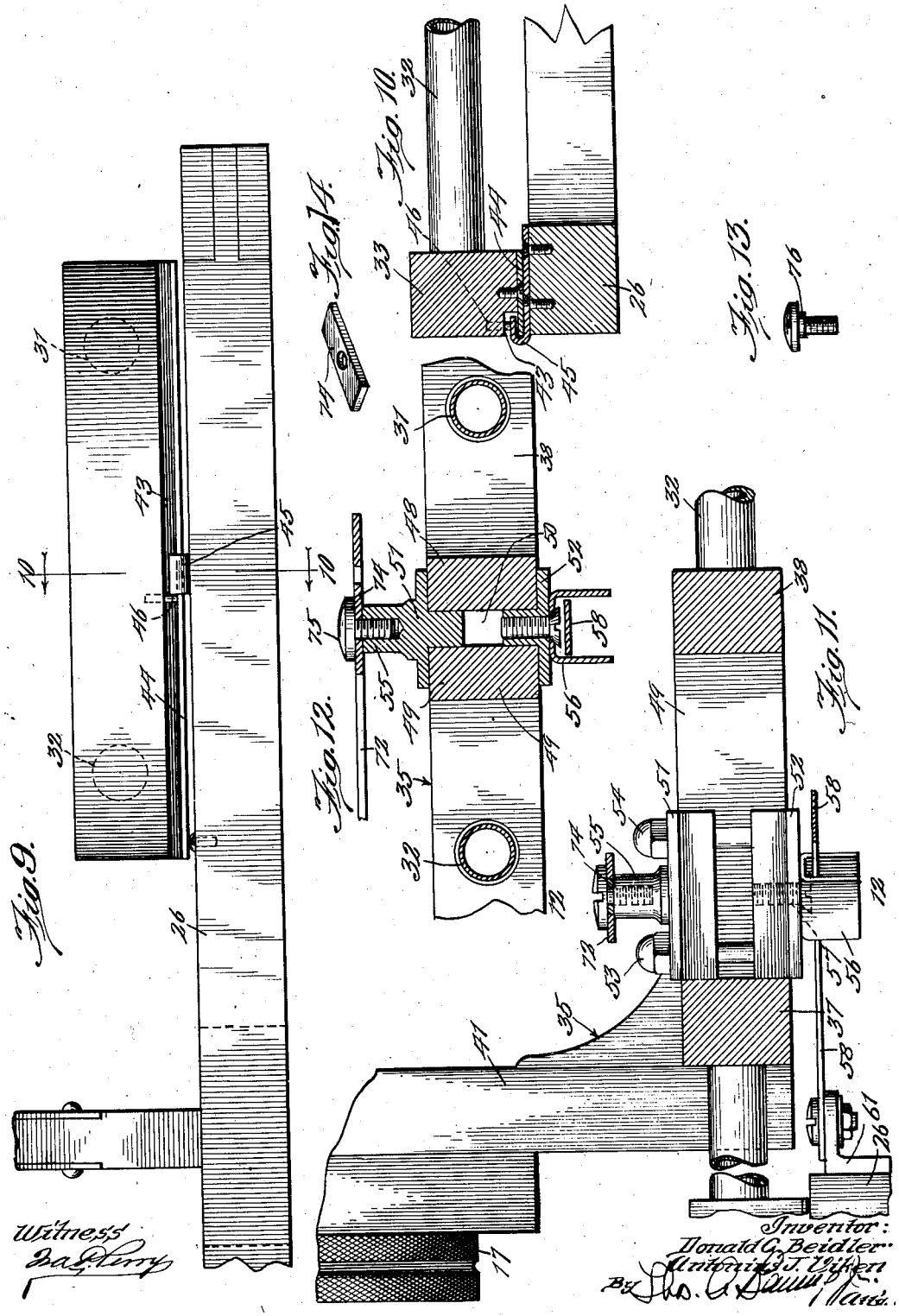

Patented Nov. 24, 1931

1,833,668

UNITED STATES PATENT OFFICE

DONALD C. BEIDLER AND ANTONIUS J. VIKEN, OF NEW YORK, N. Y., ASSIGNORS TO SAID BEIDLER, TRUSTEE

CAMERA AND THE LIKE

Substitute for application Serial No. 191,124, filed May 13, 1927. This application filed August 30, 1930. Serial No. 479,074.

This invention has to do with certain improvements in cameras and the like. The invention has reference particularly to improvements in portrait cameras of the general type disclosed in Letters Patent of the United States No. 1,528,464 which was issued to us March 3, 1925; but it will presently appear that certain of the features herein disclosed are not limited to use in cameras of the foregoing or any other particular type.

Inasmuch however, as the features of the present invention have been devised especially with reference to cameras of the foregoing general type, we will make reference to the same; but in so doing, we wish it distinctly understood that we do not thereby intend to limit ourselves nor the usefulness of the features of the present invention, except in so far as we may do so in the claims.

In cameras of the type just referred to, there are used two companion cameras, one of which is the camera proper wherein the plate or other sensitized surface is located, and the other constituting a finder which is peculiarly related to the camera proper. The cameras herein disclosed are especially intended for executing very fine portrait work and especially for executing pictures of relatively young children and babies, who are so immature that it is difficult if not impossible to have them pose for a sufficient length of time to enable the photographer to substitute the plate and take the picture after establishing the desired focus.

Cameras embodying the features of the present invention are provided with duplicate lenses and image surfaces located an equal distance apart so that duplicate images are formed on the image surfaces. One of these surfaces is the sensitized surface of the true camera, and the other is the image plate of the finder camera. These two cameras are always worked in such harmony that their focal lengths are always equal and furthermore, they are always directed at a common object. That is to say, their focal lengths may be adjusted, but being adjusted, the focal lengths of both elements are always equal; and furthermore, both elements always maintain focus on a common object whether the same be close up to the lenses or distant therefrom.

In view of the foregoing fundamental conditions, it follows that if the focal lengths of both elements are adjusted to either increase or decrease them, the focal axes of the two elements must be deflected towards or from each other so as to maintain focus on a given object. If that object is moving back and forth with respect to the position of the camera, the focal lengths of the two elements are correspondingly adjusted and furthermore the two axes are deflected back and forth with respect to each other in proper harmony.

Both of the elements are so arranged that their rear ends remain in substantially fixed position, the variations in focal length being accomplished by back and forth movements of the front ends accompanied by the proper movement of said front ends towards or from each other. This makes it possible to secure the desired adjustments without unnecessary movements of the image surfaces at the rear ends of the units.

One of the objects of the inventon is to make provision for tilting the rear end portions of the units in exact harmony by means of the very simple construction so that the necessary adjustments of the image surfaces with respect to the vertical plane may be effected.

In connection with the foregoing, it is an object to provide a very simple form of construction, and one whereby the image surfaces of the two units may be harmoniously moved regardless of the focal lengths adjustments.

A further feature of the invention relates to the provision of an improved form of construction for shifting the front or lens ends of the units back and forth in harmony, this arrangement being provided with an operating handle or knob which is very conveniently located with respect to the position of the operator.

A further feature of the invention relates to the provision of an improved construction for shifting the front or lens ends towards and from each other in proper harmony as the back and forth movements are effected. This improved construction is such that a very rigid structure is provided, one which can be cheaply built, and one which will be very accurate and positive in its operations.

A further object in connection with the foregoing is to provide an arrangement whereby the foregoing mechanism may be so adjusted that the proper harmony of movements will be established, thus making it possible to bring the device into proper adjustment in those cases in which a slight maladjustment may be found.

A further feature of the invention relates to the provision of means whereby the various parts may be conveniently mounted upon a simple platform, which in turn may be supported upon and connected to any convenient form of stand, such for example as that illustrated in our co-pending application for Letters Patent of the United States on improvements in stands for cameras and the like, Serial No. 185,179, executed April 14th, 1927, and filed in the United States Patent Office April 20, 1927.

Another feature of the invention relates to the provision of an improved construction of hood or jacket for use in connection with the finder or ground glass image surface. This hood is so constructed that it will normally return to a central position wherein the central portion of the image field is directly visible, but the hood is spring supported so that it can be readily deflected from side to side or back and forth in order to bring it into line with other portions of the image field which are to be examined in detail.

It is a further object in connection with the foregoing to provide a hood which is very simple of construction and can be readily attached to finders of types now in extensive use.

Other objects and uses of the invention will appear from a detailed description of the same, which consists in the features of construction and combinations of parts hereinafter described and claimed.

In the drawings:

Figure 1 shows a plan view of the entire camera structure;

Figure 2 shows a side elevation corresponding to Fig. 1, a portion of the finder being broken away and also the hood being shown in vertical section;

Figure 3 shows a plan view of the principal operating mechanism for securing the necessary adjustment, being taken substantially on the line 3—3 of Figure 2, looking in the direction of the arrows;

Figure 4 shows a section through the mechanism for securing the back and forth movements, being taken substantially on the line 4—4 of Figure 3, looking in the direction of the arrows, but on enlarged scale;

Figure 5 is a detailed section on the line 5—5 of Figure 4, looking in the direction of the arrows;

Figure 6 is a detailed section on the line 6—6 of Figure 4, looking in the direction of the arrows;

Figure 7 is a detailed section on the line 7—7 of Figure 4, looking in the direction of the arrows;

Figure 8 is a detailed section on the line 8—8 of Figure 4, looking in the direction of the arrows;

Figure 9 is a fragmentary front elevation of the lower portion of one of the units showing the guide arrangement for preventing the same from lifting away from the platform, being a fragmentary section on the line 9—9 of Figure 1, looking in the direction of the arrows, but on enlarged scale;

Figure 10 shows a fragmentary cross section on the line 10—10 of Figure 9, looking in the direction of the arrows;

Figure 11 shows a fragmentary detailed section on the line 11—11 of Figure 3, looking in the direction of the arrows, but on enlarged scale;

Figure 12 shows a fragmentary section on the line 12—12 of Figure 3, looking in the direction of the arrows, but on enlarged scale, and may also be considered as a section on the line 12—12 of Figure 11 looking in the direction of the arrows;

Figure 13 shows a detailed view of the guide screw at the top end of the device shown in Figures 11 and 12;

Figure 14 shows a detailed perspective view of the guide block which is engaged by the screw illustrated in Figure 13;

Figure 15 shows a detailed section on the line 15—15 of Figure 2, looking in the direction of the arrows, but on enlarged scale; and Figure 16 shows a detailed section on the line 16—16 of Figure 3, looking in the direction of the arrows, but on enlarged scale.

In the drawings the two camera units are designated by the numerals 15 and 16 respectively. One of these is a true camera in which the plate or other sensitized surface is exposed and the other is a finder camera. In the construction illustrated 16 is the true camera and 15 is the finder camera. Each of these is provided with the customary lens 17 which can be moved back and forth with respect to the image surface, a collapsible bellows or the like 18 being provided in the customary manner.

The adjustments of focal lengths are made by shifting the front or lens end back and forth while keeping the rear or image surface at a fixed point. It is therefore desirable to provide for back and forth adjustment of the front or lens ends of the two elements while maintaining the rear or image surface ends at a fixed point, and in order to keep both elements focused on a common object it is necessary to swing the focal axes about vertical pivotal axes at the rear or image plane ends of the units. Thus, as the units are focused on objects close at hand, the focal axes must be swung towards each other, whereas, as the units are focused on objects more distantly removed it becomes necessary to swing the focal axes outwardly and bring them more nearly into parallelism.

In order to provide for the foregoing adjustments, each of the units has its rear end portion (usually in the form of a box) pivoted on a vertical central axis. These are the boxes 19 and 20 best shown in Fig. 1. They are carried by brackets including the vertical side plates 21 which reach upwards from the rear frame members 22 and 23 (see Fig. 3). These rear frame members are pivoted at the points 24 and 25 to a common platform 26 which in turn may be supported upon a convenient stand or table, carried by a suitable device such as a tripod. This platform 26 is conveniently cut away at its central portions as shown at 27 and 28 in Fig. 3 so as to lighten the structure and provide a less cumbersome device.

The rear frame members 22 and 23 are also conveniently hollowed out or cut away in their central portions as shown at 29 and 30 in Fig. 3 so as to lighten these elements.

Reaching forward from each of the rear frame members 22 and 23 is a pair of tubes 31 and 32. These pairs are joined together at their front ends by the cross blocks 33 and 34 corresponding to the two units respectively. The pairs of tubes constitute horizontal rails upon which are slidably mounted bracket frames 35 and 36 corresponding to the two units respectively. Each of these bracket frames includes a cross member 37 and a rear member 38. The members 37 and 38 of each frame are joined together by the side pieces 39 and 40, the front ends of which reach upwardly as best shown in Figures 2 and 11 so as to establish supports for the front pieces 41 and 42 of the two units 15 and 16. The lenses 17 are carried by these front pieces 41 and 42 in the usual manner.

It is thus evident that by shifting the frames 35 and 36 back and forth on the tubular rails the two units 15 and 16 may be lengthened or shortened; and by swinging the front ends 33 and 34 towards and from each other the frames will be caused to pivot on the rear pivots 24 and 25, respectively.

The front blocks 33 and 34 are grooved as shown in Fig. 10 with the curved grooves 43 which are closed at their lower sides by the plates 44. The stationary frame 26 is provided at its front edge with clips 45 which reach into the grooves 43 and prevent the front ends 33 and 34 of the two swinging frames from lifting away from the platform 26, while at the same time allowing said front ends to swing freely about the pivotal points 24 and 25. The swinging frame members 33 and 34 are provided with pins 46 and 47 which extend across the grooves 43 and limit the outward swing of the two camera sections by permitting them to swing towards each other without interference.

Each of the frames 35 and 36 is provided with a pair of central blocks 48 and 49 (see Figures 3 and 12), which are slightly separated to provide a slot 50. Upper and lower bracket members 51 and 52 respectively are placed on these members 48 and 49 and are drawn together by bolts or machine screws 53 and 54 (see Fig. 11 in particular). Preferably the bracket members 51 and 52 are also tongued, so as to keep them properly lined up.

The top bracket member 51 has an upstanding stud or post 55. The bottom bracket 52 has connected thereto a U-shaped clip 56, the same being secured by a screw 57.

Carried by the platform 26 are the two guide bars 58 and 59 corresponding to the two frames 35 and 36 (see Fig. 3 in particular). The rear ends of these guide bars are carried by bracket plates 60, and the front ends thereof are carried by the bracket plates 61, all of said bracket plates being suitably connected to the platform 26. These bracket plates are also preferably slotted transversely and the ends of the guide bars 58 and 59 are connected to the brackets by through bolts reaching through said slots. Consequently the exact positions of the ends of the guide bars may be readily adjusted so as to insure the exact control of the movements of the brackets 35 and 36.

The clips 56 already referred to on the frames 35 and 36 engage the guide bars 58 and 59 so that as the frames 35 and 36 are moved back and forth they are also compelled to swing towards or from each other on the pivotal points 24 and 25. The necessary clearances may be allowed in the clips 56 to take care of slight angularity in such movements or the clips may be allowed to turn slightly on the screws 57 (see Figure 12) for this purpose.

In order to cause the back and forth movements of the frames 35 and 36 we have provided a slidable frame member 62 best shown in Figures 1 and 3. The same comprises a plate having the side arms 63 and 64 which reach out to the positions of the studs 55 already referred to as being connected with the frames 35 and 36 (see Figure 12). The central portion of the bracket plate 62 slides upon a pair of vertical plates 65 and 66, the ends of which are secured to the brackets 67 and 68 mounted upon the platform 26. A top plate 69 is placed above the sliding bracket plate 62, said top plate being also connected to the brackets 67 and 68 at a proper clearance above the plates 65 and 66 to allow for the proper sliding of the bracket plate. The bracket plate is provided on its top surface with a pair of guide bars 70 and 71 at the sides of the top plates 69 so that the bracket plate 62 is prevented from rocking or oscillating as it slides back and forth.

By reason of the above construction, the bracket 62 is compelled to slide back and forth with a truly rectilinear movement and a line drawn through its outer ends always lies at right angles to the direction of movement of the bracket.

The outer ends of the bracket are slotted as shown at 72 and 73 (see Figure 3 in particular) and blocks 74 are set into these slots, these blocks resting upon the tops of the studs 55 already referred to (see Figures 12 and 14). The flat head screws 75 pass through the blocks 74 and into the studs 55, the heads of said screws overlying the edges of the slots 72 and 73 of the bracket plate 62 so that the parts can not become disengaged. If desired, the flat head screws 75 may be provided with a squared or rectangular shank portion 76 as shown in Figure 13, the same when used serving to prevent the screws from being drawn up too tight and thus preventing any binding action.

Lying between the side plates 65 and 66 there are the rear sprocket wheel 77 and the front idler 78 (see Figure 4). The chain 79 passes over the sprocket and idler, lying between the plates 65 and 66. The sprocket 77 is carried by a control shaft 80 which reaches across the platform 26 to the left hand side thereof and its projecting end carries a knob 81 by means of which it can be conveniently rotated. This shaft 80 is suitably journaled in a bracket 82 at the left hand side of the platform 26.

A stud or screw 83 reaches down through the center of the bracket plate 62 and through one of the links of the chain; being secured in place by a pair of lock nuts 84. The screw 83 is conveniently a flathead screw and is counter sunk in the bracket plate 62 and is placed beneath the top plate 69 as best shown in Figure 7.

By means of this arrangement the turning of the knob 81 which is convenient of access to the operator's left hand causes the bracket 62 to move back and forth, thereby simultaneously moving the front lens ends of the two units back and forth in perfect harmony. Due to the guide rail construction already explained, said front ends are also swung towards or from each other in proper harmony so that a common object is always kept in focus and furthermore it is possible to make preliminary adjustments so as to perfectly insure this result.

Inasmuch as the image surfaces remain substantially stationary during the foregoing adjustments (the only movement being a very slight angular movement on the pivot points 24 and 25), it follows that the operator can very easily watch the image surface of the finder unit and can therefore very readily make his adjustments so as to bring and keep the object in perfect focus. Thus, for example, in the case of a child running around or playing, the operator is enabled to follow the child's movements continuously and perfectly both as respects movements towards and from the camera as well as movements back and forth or up and down. The former are followed by proper manipulation of the knob 81 so as to move the lenses back and forth; and the sidewise or up and down movements are followed by changing the direction of the entire camera by proper manipulation of the platform 26.

In order to provide for proper focus of the upper and lower portions of the image the image surfaces can be rocked about horizontal axes. For this purpose the rear portions 19 and 20 of the camera units are pivoted on the central horizontal axes 83ᵉ established by the bracket arms 21 already referred to. In order to make this adjustment, the lower edges of the rear portions 19 and 20 of the two units are provided with curved rack bars 84ᵃ. These are engaged by pinions on the two shafts 85 and 86 of the two units respectively. These shafts are joined together by a universal coupling 87 at a point intermediate between the lower portions of the units so that by turning a single knob 88 (or 89) on one or the other of the two shafts 85 and 86, both shafts are compelled to turn in unison and thus both of the image surfaces are simultaneously tilted.

The universal coupling 87 includes the sections 90 and 91 on the two shafts, together with a central block 92 to which the members 90 and 91 are connected by pivots established by the screws 93; and the members 90 and 91 are preferably slotted where the screws 93 pass through so as to take care of slight back and forth movements which may be occasioned when the camera units are tilted on the pivotal points 24 and 25.

If desired, a snap device may be provided for normally retaining the camera boxes 19 and 20 in the vertical position on the horizontal pivotal points. For example, one of the bracket arms 21 adjacent to each of the camera boxes may be perforated to receive a small steel ball 93ᵃ (see Figure 15) which ball is normally pressed inwards by a spring clip 93ᵇ and against a plate 93ᶜ on the lower portion of the camera box. This plate is in turn provided with perforation or socket 93ᵈ into which the ball will drop at the instant of vertical alignment of the camera box.

It may also be found advisable to place a resistance or brake on each of the shafts 85 and 86 so as to normally retain the same against rotation with a sufficient amount of resistance to keep the parts properly aligned once they have been brought into position. For this purpose a small friction brake 93ᵉ (see Figure 16) may be clamped around each of said shafts, being tightened up to the necessary amount by a screw 93ᶠ.

Ordinarily the finder unit 19 will be provided with a finder 94 open at its top edge 95 and provided with a reflecting surface 96 so that the operator will see the image reflected from said surface 96.

The finder 94 is conveniently attached to the rear end 19 of the finder unit by means of hood pins 97 at the lower end of the unit 19 together with clips 98 at the upper end thereof. These clips 98 in turn snap over pins 99 on the top edge of the finder 94 whereby the latter may be conveniently snapped into place or readily disengaged.

It is customary to use a suitable cloth hood or the like in conjunction with the finder 94 so as to cut out interference from extraneous illumination and also to concentrate the attention of the operator entirely on the reflected image. In the present case we have provided an improved construction of hood to be used in connection with the finder 94. The same includes a face mask 100 of suitable shape and size to accommodate the eyes and forehead and the upper portion of the operator's face when set down against the upper edge 101 thereof. This mask is made of suitable material such as hard rubber, bakelite, wood, or other material and preferably the upper edge thereof is faced with suitable cloth such as velvet. Joining the hood 100 to the upper portion of the finder 94 is a series of spiral springs 102 (preferably four in number, one at each corner of a rectangular structure, only two being illustrated in Figure 2).

These springs have their lower ends connected to plates 102ᵃ (see Fig. 2) there being one such plate at each side of the finder 94. Each of the plates 102ᵃ has one end longitudinally slotted as shown at 102ᵇ and the other end transversely slotted as shown at 102ᶜ so that said plates can be readily engaged at their rear ends with pins 102ᵈ and then turned down to engage their front ends with pins 102ᵉ. The lower ends of springs 102 are connected to the plates 102ᵃ by the use of pins 103; and the upper ends of said springs are connected to the hood 100 by the use of pins 104. As a result thereof the hood 100 can be moved around sidewise or back and forth with considerable freedom, with respect to the finder 94, so that the operator can concentrate his attention on any selected portion of the image field; and furthermore, the operator is thus enabled to bring his line of vision into direct registry with any selected portion of the image field so that it can be perfectly viewed.

Preferably a cloth or light proof shield 105 has its upper edge 106 connected to the hood 100 and its lower edge 107 is draped around the upper portion of the finder 94. The forward portion 108 of the lower portion 107 is preferably connected to the rear portion 19 of the finder unit or to the upper portion of the finder 94 as illustrated in Figure 2 so as to prevent the same from falling back and interfering with the field of vision. The draping of the remaining portion of the shield 105 down around the finder 94 without attachment thereto makes it possible for the same to slide back and forth as the face mask 100 is moved around.

It will also be noted that the support of the mask 100 by means of the spiral springs is such that said mask will not be pressed straight down without exerting an undue force thereon, so it is retained at a proper distance from the position of the reflecting surface 96 as it is moved around.

Although we have herein disclosed a certain improved form of hood, still we have not claimed the same in the present application inasmuch as the same is claimed in our application for patent on improvements in hoods for camera finders and the like, Serial No. 294,718, filed July 23, 1928, and patented November 26, 1929, as No. 1,737,038. In like manner, although we have herein disclosed a new and improved form of tilt-back, still we do not claim the same in this case inasmuch as the same is claimed in our copending application for tilt-backs for cameras and the like, Serial No. 265,805, filed March 29, 1928, and patented March 17, 1931, as No. 1,796,315.

This application is a substitute for our application, Serial No. 191,124, for improvements in cameras and the like, filed May 13, 1927, allowed May 17, 1929, and lapsed for nonpayment of the final fee.

While we have herein shown and described only a single embodiment of the features of our present invention, still we do not intend to limit ourselves thereto except as we may do so in the claims.

We claim:

1. In a camera of the type described, the combination of a platform, a pair of companion rear frame members located side by side adjacent to the rear edge of said platform, pivotal connections between said frame members and the platform, a pair of parallel guide rails on each frame member extending forwardly therefrom and located above the platform, cross pieces connecting together the front ends of the pairs of guide rails aforesaid, cooperating guide means on the front portion of the platform and on said cross pieces permitting back and forth swinging movement of the frame members together with the guide rails and cross pieces while retaining the same against movement upward away from the platform, a slide member mounted on the guide rails of each frame member, a downwardly extending guide clip on each slide member, guide bars on the platform having their front portions converging towards each other, the clips of the slide members engaging the respective guide bars and being guided thereby as the slide members are moved on the guide rails, means for adjusting said guide bars on the platform to thereby adjust the co-operating movements of the slides due to engagement with the guide bars, a movable frame member on the platform, outwardly reaching arms on said frame member, pin and slot connections between said arms and the slide members aforesaid operative effectively to shift the slide members back and forth as the frame member is moved back and forth, means for guiding the frame member in its back and forth movements, to thereby insure rectilinear movements thereof, a control shaft journaled on the platform, a sprocket on the same, a chain operated by said sprocket, a connection between said chain and the movable frame member, whereby rotations of said shaft serve to shift the frame member back and forth, upstanding brackets on the rear frame members, camera boxes pivotally mounted on said brackets and capable of tilting movement about horizontal axes, shafts journaled on the rear frame members aforesaid, rack and pinion connections between said shafts and the lower portions of the camera boxes, a universal joint connection between the inner ends of the two shafts aforesaid, including slip connections in said universal joint permitting slight axial adjustments while maintaining the two shafts in angular relation at all times, whereby both of said shafts may be rotated simultaneously to adjust the tilt of both boxes simultaneously, suitable lens elements carried by the slide members and suitable bellows connections between the respective lenses and the camera boxes, substantially as described.

2. In a camera of the type described, the combination of a platform, a pair of companion rear frame members located side by side adjacent to the rear edge of said platform, pivotal connections between said frame members and the platform, a pair of parallel guide rails on each frame member extending forwardly therefrom and located above the platform, cross pieces connecting together the front ends of the pairs of guide rails aforesaid, a slide member mounted on the guide rails of each frame member, a downwardly extending guide clip on each slide member, guide bars on the platform having their front portions converging towards each other, the clips of the slide members engaging the respective guide bars and being guided thereby as the slide members are moved on the guide rails, means for adjusting said guide bars on the platform to thereby adjust the co-operating movements of the slides due to engagement with the guide bars, a movable frame member on the platform, outwardly reaching arms on said frame member, pin and slot connections between said arms and the slide members aforesaid operative effectively to shift the slide members back and forth as the frame member is moved back and forth, means for guiding the frame member in its back and forth movements, to thereby insure rectilinear movements thereof, a control shaft journaled on the platform, a sprocket on the same, a chain operated by said sprocket, a connection between said chain and the movable frame member, whereby rotations of said shaft serve to shift the frame member back and forth, upstanding brackets on the rear frame members, camera boxes pivotally mounted on said brackets and capable of tilting movement about horizontal axes, shafts journaled on the rear frame members aforesaid, rack and pinion connections between said shafts and the lower portions of the camera boxes, a universal joint connection between the inner ends of the two shafts aforesaid, including slip connections in said universal joint permitting slight axial adjustments while maintaining the two shafts in angular relation at all times, whereby both of said shafts may be rotated simultaneously to adjust the tilt of both boxes simultaneously, suitable lens elements carried by the slide members and suitable bellows connections between the respective lenses and the camera boxes, substantially as described.

3. In a camera of the type described, the combination of a platform, a pair of companion rear frame members located side by side adjacent to the rear edge of said platform, pivotal connections between said frame members and the platform, a pair of parallel guide rails on each frame member extending forwardly therefrom and located above the platform, cross pieces connecting together the front ends of the pairs of guide rails aforesaid, a slide member mounted on the guide rails of each frame member, a downwardly extending guide clip on each slide member, guide bars on the platform having their front portions converging towards each other the clips of the slide members engaging the respective guide bars and being guided thereby as the slide members are moved on the guide rails, means for adjusting said guide bars on the platform to thereby adjust the co-operating movements of the slides due to engagement with the guide bars, a movable frame member on the platform, outwardly reaching arms on said frame member, pin and slot connections between said arms and the slide members aforesaid operative effectively to shift the slide members back and forth as the frame member is moved back and forth, means for guiding the frame member in its back and forth movements, to thereby insure rectilinear movements thereof, means under control of the operator for shifting the frame member back and forth with respect to the platform, a control shaft journaled on the platform, a sprocket on the same, a chain operated by said sprocket, a connection between said chain and the movable frame member, whereby rotations of said shaft serve to shift the frame member back and forth, upstanding brackets on the rear frame members, camera boxes mounted on said brackets, suitable lens elements carried by the slide members and suitable bellows connections between the respective lenses and the camera boxes, substantially as described.

4. In a camera of the type described, the combination of a platform, a pair of companion rear frame members located side by side adjacent to the rear edge of said platform, pivotal connections between said frame members and the platform, a pair of parallel guide rails on each frame member extending forwardly therefrom and located above the platform, cross pieces connecting together the front ends of the pairs of guide rails aforesaid, a slide member mounted on the guide rails of each frame member, a downwardly extending guide clip on each slide member, guide bars on the platform having their front portions converging towards each other, the clips of the slide members engaging the respective guide bars and being guided thereby as the slide members are moved on the guide rails, means for adjusting said guide bars on the platform to thereby adjust the co-operating movements of the slides due to engagement with the guide bars, a movable frame member on the platform, outwardly reaching arms on said frame member, pin and slot connections between said arms and the slide members aforesaid operative effectively to shift the slide member back and forth as the frame member is moved back and forth, means for guiding the frame member in its back and forth movements to thereby insure rectilinear movements thereof, upstanding brackets on the rear frame members, camera boxes mounted on said brackets, suitable lens elements carried by the slide members and suitable bellows connections between the respective lenses and the camera boxes, substantially as described.

5. In a camera of the type described, the combination of a platform, a pair of companion rear frame members located side by side adjacent to the rear edge of said platform, pivotal connections between said frame members and the platform, a pair of parallel guide rails on each frame member extending forwardly therefrom and located above the platform, cross pieces connecting together the front ends of the pairs of guide rails aforesaid, a slide member mounted on the guide rails of each frame member, guide bars on the platform having their front portions converging towards each other, co-operating elements on the slide members co-operating with said guide bars, a movable frame member on the platform, outwardly reaching arms on said frame member, suitable connections between said arms and the slide members aforesaid operative effectively to shift the slide members back and forth as the frame member is moved back and forth, and means for guiding the frame member in its back and forth movements to thereby insure rectilinear movements thereof, substantially as described.

6. In a camera of the type described, the combination of a platform, a pair of companion rear frame members located side by side adjacent to the rear edge of said platform, pivotal connections between said frame members and the platform, a slide member slidably mounted with respect to each frame member, guide bars on the platform having their front portions converging towards each other, co-operating elements in conjunction with the slide members engaging the respective guide bars and being guided thereby as the slide members are moved with respect to the frame members, a movable frame member on the platform, outwardly reaching arms on said frame member, pin and slot connections between said arms and the slide members aforesaid operative effectively to shift the slide members back and forth as the frame member is moved back and forth, and means for guiding the frame member in its back and forth movements to thereby insure rectilinear movements thereof, substantially as described.

7. In a camera of the type described, the combination of a platform, a pair of companion rear frame members pivotally mounted on the rear portion thereof, slide members slidably mounted with respect to each of said frame members, guide bars on the platform, cooperating elements on the slide members engaging the guide bars to guide the slide members in their back and forth movements, a movable frame member on the platform, outwardly reaching arms on said frame member, pin and slot connections between said arms and the slide members aforesaid operative effectively to shift the slide members back and forth as the frame member moves back and forth, and means for guiding the frame member in its back and forth movements to thereby insure rectilinear movements thereof, substantially as described.

8. In a camera of the type described, the combination of a platform, a pair of companion rear frame members pivotally mounted on the rear portion thereof, slide members slidably mounted with respect to each of said members, guide bars on the platform, means for adjusting said guide bars with respect to each other, co-operating elements on the slide members engaging the guide bars to guide the slide members in their back and forth movements and means for moving the slide members back and forth in unison with respect to the frame members, substantially as described.

DONALD C. BEIDLER.
ANTONIUS J. VIKEN.